(12) United States Patent
Steijer et al.

(10) Patent No.: US 9,651,749 B1
(45) Date of Patent: May 16, 2017

(54) INTERPOSER WITH OPAQUE SUBSTRATE

(71) Applicant: Tyco Electronics Svenska Holdings AB, Järfalla (SE)

(72) Inventors: Odd Robert Steijer, Bromma (SE); Hans Magnus Emil Andersson, Järfalla (SE)

(73) Assignee: Tyco Electronics Svenska Holdings AB (SE)

( * ) Notice: Subject to any disclaimer, the term of this patent is extended or adjusted under 35 U.S.C. 154(b) by 0 days.

(21) Appl. No.: 15/087,432

(22) Filed: Mar. 31, 2016

(51) Int. Cl.
*G02B 6/12* (2006.01)
*G02B 6/42* (2006.01)

(52) U.S. Cl.
CPC ............ *G02B 6/4257* (2013.01); *G02B 6/423* (2013.01); *G02B 6/4244* (2013.01); *G02B 6/4292* (2013.01)

(58) Field of Classification Search
CPC .. G02B 6/4257; G02B 6/4244; G02B 6/4214; G02B 6/4245; G02B 6/4228; G02B 6/423; G02B 6/4219; G02B 6/4259; G02B 6/4246
See application file for complete search history.

(56) References Cited

U.S. PATENT DOCUMENTS

| | | | | |
|---|---|---|---|---|
| 6,759,687 B1* | 7/2004 | Miller | ..................... | H01L 33/58 257/432 |
| 7,239,767 B2* | 7/2007 | Kim | ........................ | G02B 6/42 385/14 |
| 7,703,993 B1* | 4/2010 | Darbinyan | ........... | G02B 6/4214 385/88 |
| 7,750,289 B2* | 7/2010 | Feldman | ................... | G01J 1/02 250/239 |
| 7,918,610 B2* | 4/2011 | Fujiwara | ............... | G02B 6/4214 385/49 |
| 7,978,940 B2* | 7/2011 | Steijer | .................. | B23K 1/0016 385/14 |
| 8,232,142 B2* | 7/2012 | Steijer | .................... | G02B 6/423 257/E23.116 |
| 8,265,432 B2* | 9/2012 | Doany | ................. | G02B 6/4201 257/432 |
| 8,317,411 B2* | 11/2012 | Fujiwara | ............... | G02B 6/4292 385/92 |
| 8,620,122 B2* | 12/2013 | Meadowcroft | ...... | G02B 6/4286 385/14 |
| 8,867,869 B2* | 10/2014 | Steijer | .................. | G02B 6/4201 257/680 |

(Continued)

*Primary Examiner* — Rhonda Peace

(57) ABSTRACT

An interposer comprising a substrate having at least a top surface and a bottom surface, the top and bottom surfaces being substantially parallel; at least one series of bottom cavities on the bottom surface; at least one expansion cavity contiguous with the at least one series of bottom cavities, the at least one expansion cavity being larger than each of the bottom cavities; a perimeter defined on the bottom surface around the bottom cavities; at least one alignment fiducial on the top surface for cooperating with a corresponding fiducial on the detachable optical interface to optically couple an optical conduit attached to the detachable optical interface with at least one optical device; and the at least one optical device mounted to the substrate on at least a portion of the perimeter, the optical device configured to emit a diverging light beam or receive a non-diverging light beam.

21 Claims, 7 Drawing Sheets

(56) References Cited

U.S. PATENT DOCUMENTS

| | | | | |
|---|---|---|---|---|
| 8,936,403 B2* | 1/2015 | Howard | ............... | G02B 6/3829 |
| | | | | 385/89 |
| 9,190,398 B2* | 11/2015 | Tu | ........................... | H01L 31/16 |
| 9,465,176 B2* | 10/2016 | Pommer | ............... | G02B 6/4251 |
| 2004/0252951 A1* | 12/2004 | Nagasaka | ............ | G02B 6/4201 |
| | | | | 385/88 |
| 2013/0182996 A1* | 7/2013 | Shastri | .................... | G02B 6/42 |
| | | | | 385/14 |
| 2013/0209038 A1* | 8/2013 | Pommer | ............... | G02B 6/424 |
| | | | | 385/76 |
| 2013/0330044 A1* | 12/2013 | Wu | ..................... | G02B 6/4214 |
| | | | | 385/76 |
| 2016/0091679 A1* | 3/2016 | Chou | .................. | G02B 6/4231 |
| | | | | 385/14 |

\* cited by examiner

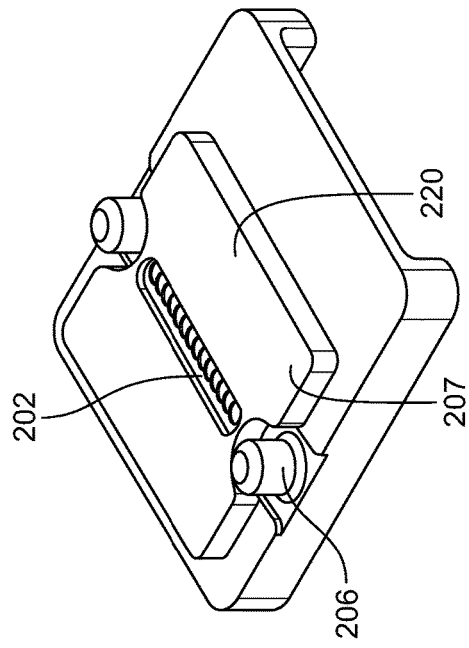
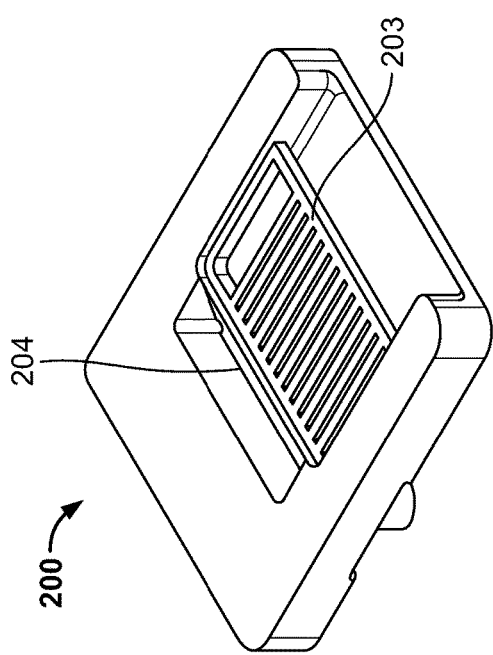
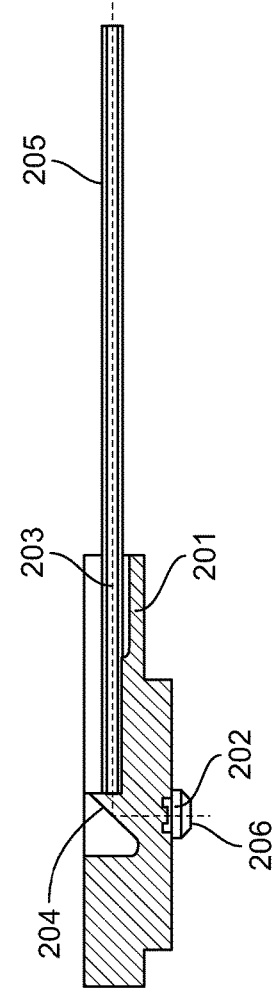
Fig. 2B
Fig. 2C

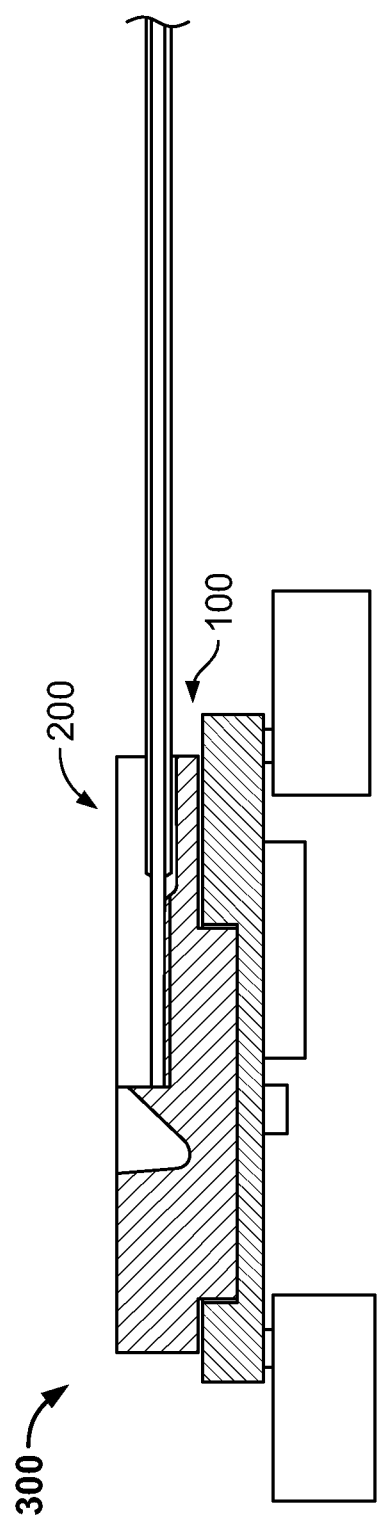

INTERPOSER WITH OPAQUE SUBSTRATE

FIELD OF DISCLOSURE

The subject matter herein relates generally to fiber optical interposers, and, more particularly, to interposers having opaque substrates.

BACKGROUND

Fiber optic components are used in a wide variety of applications. The use of optical fibers as a medium for transmission of digital data (including voice, internet and IP video data) is becoming increasingly more common due to the high reliability and large bandwidth available with optical transmission systems. Fundamental to these systems are optical subassemblies for transmitting and/or receiving optical signals.

Optical subassemblies typically comprise an interposer. As used herein, an interposer functions as a substrate for optical, opto-electrical, and electrical components and provides interconnections to optically and/or electrically interconnect the optical/opto-electrical/electrical components. There are many different configurations of interposers being used today. Of particular interest herein, are interposers comprising a glass substrate or carrier which is configured to receive and align various optical devices and to interengage a detachable optical interface having an array of lenses optically coupled to an optical conduit attached thereto such that the optical devices of the substrate are optically coupled with the optical conduit of the interface. Although this configuration continues to be effective in interfacing the optical conduit with the optical devices, the use of the glass substrate does present certain manufacturing challenges. In particular, glass can be difficult to etch accurately using known dry and wet etching techniques.

The manufacturability of the interposer may be improved by using materials having a crystalline structure, such as silicon. Such materials lend themselves to more accurate and faster etching. However, silicon is opaque for many of the wavelengths that are used commonly in optical applications. Therefore, there is a need for an interposer configuration that accommodates the opaqueness of silicon or other crystalline material. The present invention fulfils this need among others.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicant recognizes that using an opaque substrate material such as silicon in a substrate requires voids or vias to permit the transmission of optical light. Applicant also recognizes that the substrate should be of substantial thickness to provide strength and to facilitate handling. For example, a substrate thickness of at least 500 μm tends to be suitable for handling, and a substrate thickness of at least 700 μm facilitates large wafer-scale manufacturing. However, one of the obstacles facing the use of such thick substrates is the divergence of the light beams of the optical devices. Specifically, the optical devices mounted to the substrate, such as vertical cavity surface emitting lasers (VCSELs), tend to have diverging beams in the order of, for example, 30°, and are usually arranged in arrays with a pitch (i.e. the distance between then optical beams of the devices) in the order of, for example, 250 μm. Thus, at a distance 300 μm or so (well short of the desired 500+ μm thick), the divergence of the beams is such that the beams expand beyond the pitch of the optical devices. Additionally, the diameters of the vias needed to accommodate the diverging beams in a substrate just 300 μm thick or so would be so wide that there would be insufficient area around the via to mount the optical devices.

Applicants have identified a solution to this problem. According to one embodiment, the substrate is provided with at least one recess in the top surface to receive the detachable interface such that the lenses of the interface are positioned closer to the optical devices, thus reducing the divergence of the beam between the device and the lenses. Yet because the interface is received in a recess, the substrate may still be as thick as desired to add strength and provide for handling and alignment features. A series of small cavities are defined on the bottom surface to accommodate the beams being transmitted/received by the optical devices, but are sufficiently narrow to provide ample area around their perimeter to facilitate mounting of optical devices. In other words, the bottom cavities have a small width to maximize the area around them for optical device mounting. Although the bottom cavities may be too narrow to accommodate a diverging beam before the beam reaches the detachable optical interface, an expansion cavity is provided between the top and bottom cavities to expand the width of the optical pathway to accommodate the diverging beam.

Being a crystalline material like silicon, the substrate of the present invention has a number of advantages over the prior art. For example, as mention above, silicon lends itself to etching of high precision structures, such as alignment fiducials for aligning the detachable optical interface. Silicon processing is also far more developed, especially with respect to solder pad metallization, and there are numerous existing foundries available for such processing. Additionally, compared to borosilicate glass, silicon offers higher strength and better thermal conductivity.

In one embodiment, the interposer comprises: (a) an opaque, crystalline material substrate having at least: (i) a top surface and a bottom surface, the top and bottom surfaces being substantially parallel; (ii) a top cavity for receiving a detachable optical interface; (iii) at least one series of bottom cavities on the bottom surface; (iv) at least one expansion cavity contiguous with the top cavity and the at least one series of bottom cavities, the at least one expansion cavity being smaller than the top cavity and being larger than each of the bottom cavities; (v) a perimeter defined on the bottom surface around the bottom cavities; (vi) at least one alignment fiducial on the top surface for cooperating with a corresponding fiducial on the detachable optical interface to optically couple an optical conduit attached to the detachable optical interface with at least one optical device; and (b) the at least one optical device mounted to the substrate on at least a portion of the perimeter, the optical device configured to emit a diverging light beam or receive a non-diverging light beam In another embodiment, the interposer comprises: (a) a substrate having at least: (i) a top surface and a bottom surface, the top and bottom surfaces being substantially parallel; (ii) a top cavity for receiving a detachable optical interface; (iii) at least one series of bottom cavities on the bottom surface; (iv) at least one expansion cavity contiguous with the top cavity and the at least one series of bottom cavities, the at least one expansion cavity being smaller than the top cavity and being larger than each of the bottom cavities; (v) a perimeter defined on the bottom surface around the bottom cavities; (vi) at least one alignment fiducial on the top surface; (b) at least one optical device mounted to the substrate on at least a portion of the perimeter, the optical device configured to emit a diverging light beam or receive a non-diverging light beam; and (c) the detachable optical interface having a protruding area received in the top cavity and at least one fiducial for cooperating with the at least one alignment fiducial on the top surface to align the detachable optical interface with the substrate.

In yet another embodiment, the substrate has at least: (a) a top surface and a bottom surface, the top and bottom surfaces being substantially parallel; (b) a top cavity for receiving a detachable optical interface; (c) at least one series of bottom cavities on the bottom surface; (d) at least one expansion cavity contiguous with the top cavity and the at least one series of bottom cavities, the at least one expansion cavity being smaller than the top cavity and being larger than each of the bottom cavities; (e) a perimeter defined on the bottom surface around the bottom cavities for interfacing with an optical device; and (f) at least one alignment fiducial on the top surface for cooperating with a corresponding fiducial on the detachable optical interface to optically couple an optical conduit attached to the detachable optical interface with the optical device.

In a further embodiment, the substrate has at least: (a) a top surface and a bottom surface, the top and bottom surfaces being substantially parallel; (b) at least one series of bottom cavities on the bottom surface; (c) at least one expansion cavity contiguous with the top surface and the at least one series of bottom cavities, the at least one expansion cavity being larger than each of the bottom cavities; (d) a perimeter defined on the bottom surface around the bottom cavities for interfacing with an optical device; and (e) at least one alignment fiducial on the top surface for cooperating with a corresponding fiducial on a detachable optical interface to optically couple an optical conduit attached to the detachable optical interface with the optical device.

BRIEF DESCRIPTION OF DRAWINGS

FIGS. 2a, 2b and 2c show the detachable optical interface including optical fibers.

FIG. 3a shows a cross-section of the interposer including the substrate and detachable optical interface, and connections between the substrate and a printed circuit board (PCB).

FIG. 4b shows a cross-section of the silicon substrate of FIG. 4a.

DETAILED DESCRIPTION

Figure 1A:
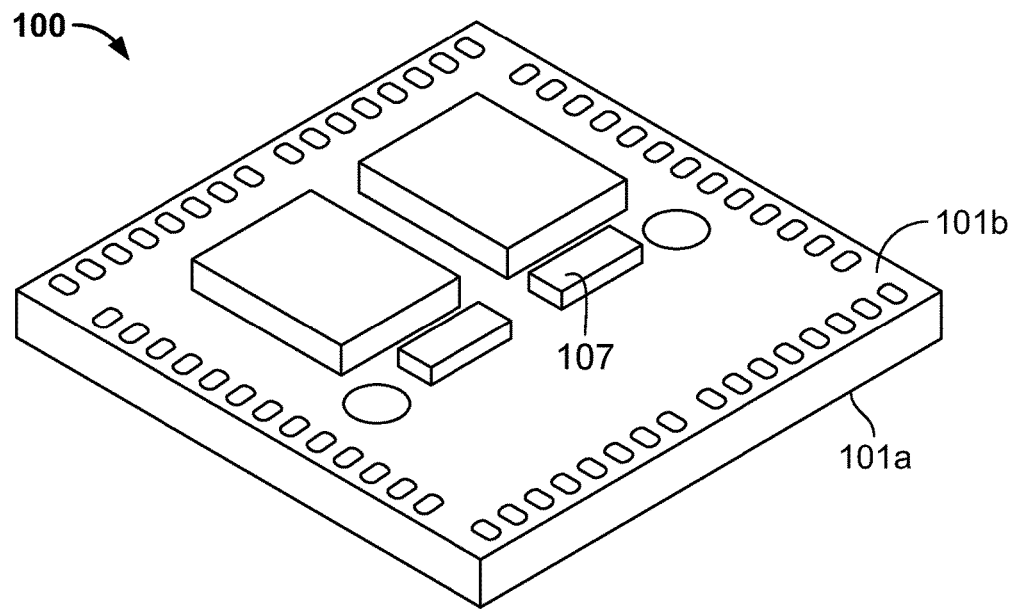
FIG. 1a shows the bottom side of the substrate with optical devices and integrated circuits (i.e. a driver and receiver) mounted thereto, and an electrical interface along its periphery.
Figure 1B:
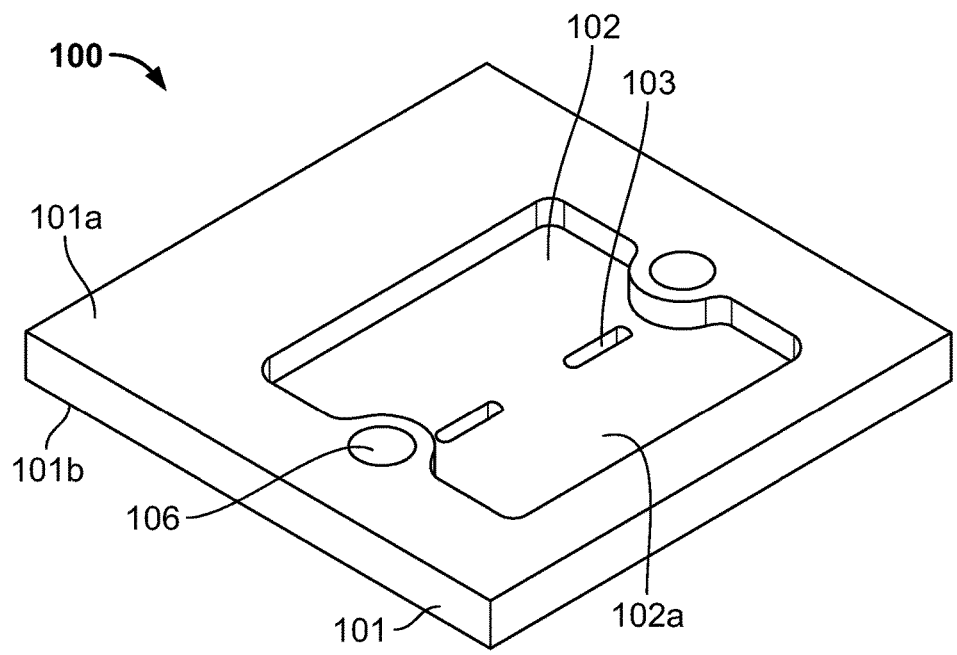
FIG. 1b shows the top side of the silicon substrate of FIG. 1a, including cavities for the light beams of the optical devices, and alignment holes for receiving corresponding alignment protrusions of a detachable optical interface.
Figure 1C:
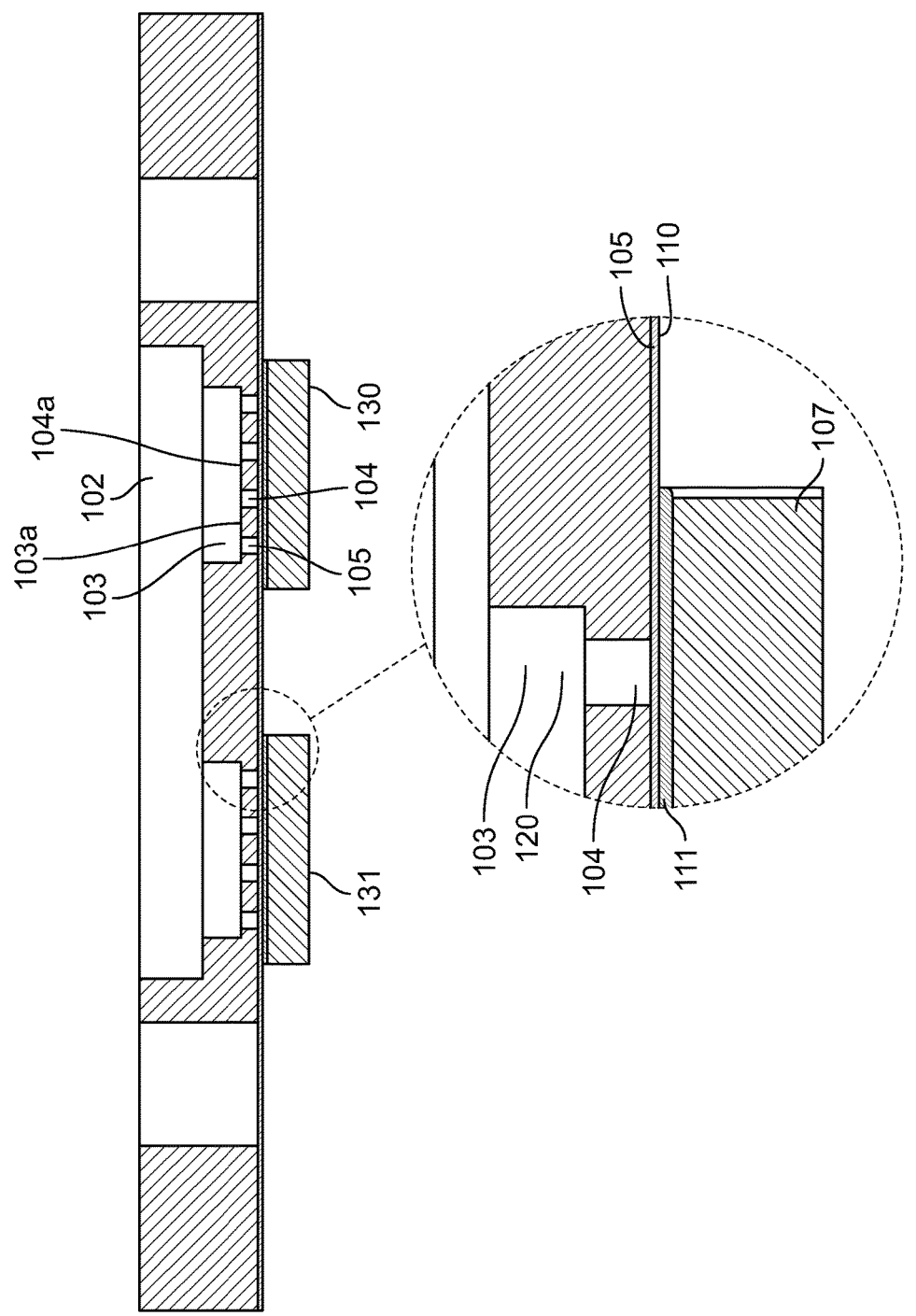
FIG. 1c shows a cross-section of the silicon substrate of FIG. 1a, showing a buffer layer that prevents optical underfill from infiltrating the cavities.

Referring to FIGS. 1a-1c, one embodiment of an interposer 100 of the present invention is shown. The interposer 100 comprises a carrier or substrate 101 having a top and bottom orientation and comprises a material having a crystalline structure, such as silicon. In this embodiment, the substrate defines at least: (a) a top surface 101a and a bottom surface 101b, the top and bottom surfaces being substantially parallel; (b) a top cavity 102 for receiving a detachable optical interface 200 (see FIG. 2), the top cavity being defined in part by a first surface 102a recessed below the top surface 101a; (c) at least one series of bottom cavities 104 defined on the bottom surface; (d) at least one expansion cavity 103 contiguous with the top cavity 102 and the at least one series of bottom cavities 104, and being defined in part by a second surface 103a below the first surface 102a, the at least one expansion cavity 103 being smaller than the top cavity 102 and being larger than each of the bottom cavities 104; (e) a perimeter 105 defined on the bottom surface around the bottom cavities 104; and (d) at least one alignment fiducial 106 on the top surface 101a. The interposer may also comprise at least one optical device 107 mounted to the substrate on at least a portion of the perimeter, the optical device configured to emit a diverging light beam or receive a non-diverging light beam. These features/elements are described in detail below. The description and figures are based on a four-channel transceiver design. This is just for illustration, however, as the invention is applicable for any channel configuration.

Figure 4A:
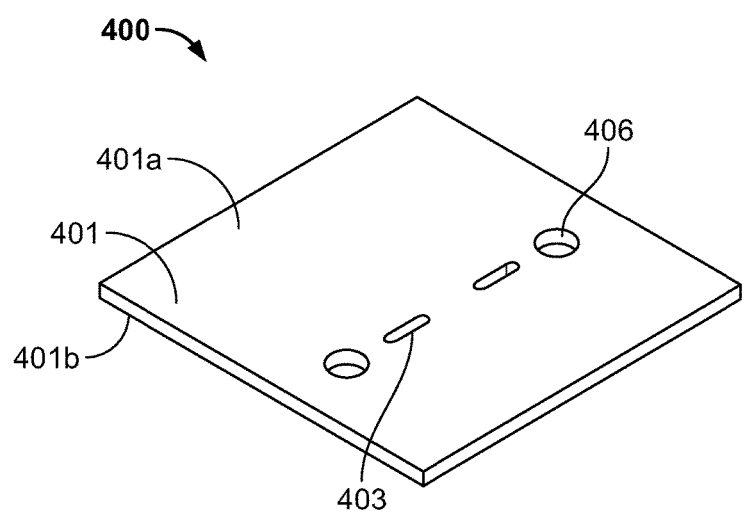
FIG. 4a shows the top side of an alternative embodiment of a silicon substrate which does not have a top cavity to accommodate the detachable optical interface.
Figure 4B:
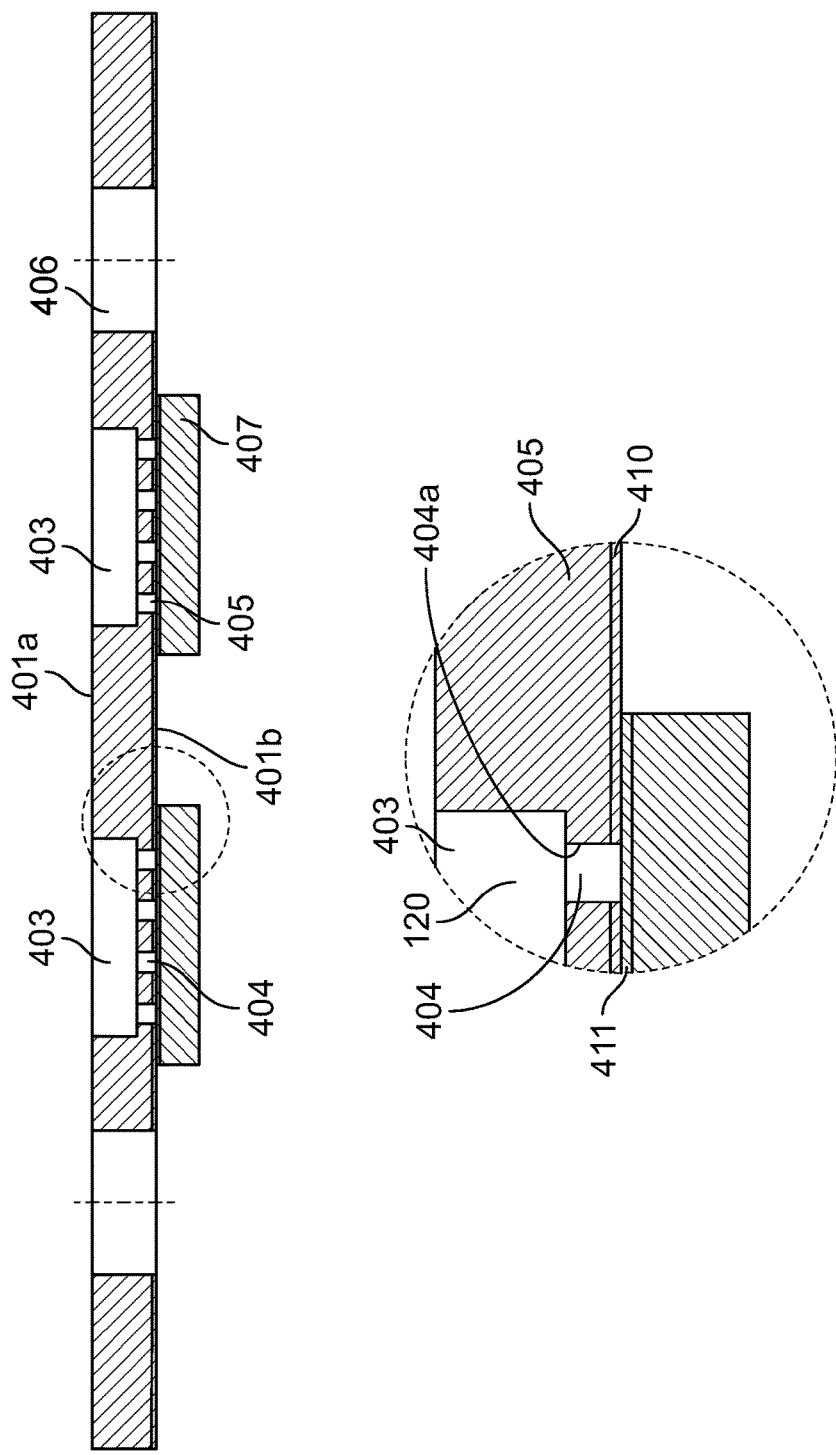

Referring to FIGS. 4a and 4b, an alternative embodiment of an interposer 400 of the present invention is shown. The main difference between interposer 400 and interposer 100 is that the substrate 401 of interposer 400 does not have a top cavity to receive the detachable optical interface. Rather, the substrate 401 is thin enough such that divergence of the beams does not expand beyond the pitch of the optical devices (e.g., the substrate's thickness is less than 300 µm or so). Specifically, referring to FIGS. 4a and 4b, the interposer 400 comprises substrate 401 having a top and bottom orientation, and comprising a material having a crystalline structure, such as silicon. In this embodiment, the substrate defines at least: (a) a top surface 401a and a bottom surface 401b, the top and bottom surfaces being substantially parallel; (b) at least one series of bottom cavities 404 defined on the bottom surface; (c) at least one expansion cavity 403 contiguous with at least one series of bottom cavities, and being defined in part by the top surface; (d) a perimeter 405 defined on the bottom surface around the bottom cavities; and (e) at least one alignment fiducial 406 on the top surface. The interposer may also comprise at least one optical device 407 mounted to the substrate on at least a portion of the perimeter, the optical device configured to emit a diverging light beam or receive a non-diverging light beam.

The primary purpose of the interposer 100, 400 is to function as the backbone to support, secure, align its various components—e.g., the optical devices, optical conduit, and supporting electrical circuitry. Accordingly, the substrate 101, 401 should be a relatively well-specified and reliable material that is thermally stable, and suitable for being heated to temperatures typical in solder reflow applications. In one embodiment, the substrate also functions as an insulator for electrical circuitry and thus should be a good dielectric. Suitable materials that are both well specified, reliable and relatively inexpensive include, for example, various types of glass, ceramics, quartz, polysilicon, amorphous silicon, and silicon. In one particular embodiment, the substrate is a crystalline material, such as silicon, which has the benefit of being particularly well specified, inexpensive, readily rendered into a good dielectric by well-known deposition methods, and lends itself to wafer level mass production and precise wet as well as dry etching and machining/dicing techniques.

The substrate 101, in one embodiment, is configured to receive and align the detachable optical interface which holds the optical conduits (described below). To this end, in one embodiment, the substrate comprises a top cavity 102 which is configured to receive the detachable optical interface. The configuration of the top cavity 102 can vary. In one embodiment, the alignment of the detachable optical interface with the substrate is achieved through alignment fiducials (discussed below), and therefore, the top cavity does not need to have a tight tolerance to receive the detachable optical interface. In other words, in an embodiment using alignment fiducials, the sides of the top cavity are not necessarily critical to position the detachable optical interface once received. Alternatively, rather than relying on alignment fiducials, alignment of the optical interface and substrate may be achieved using a precision fit between the interface and the top cavity, in which case, the top cavity can be precisely machined, along with the corresponding protrusion from the detachable optical interface. Still other embodiments will be obvious to those skilled in the art in light of this disclosure.

In the embodiment depicted in FIG. 1b, the top cavity 102 has a first surface 102a, which is at least partially a planar surface suitable for contact with a corresponding plane or surface 207 on the detachable interface 200 (see FIG. 2b). Although a planar surface is depicted here, it should be understood that other embodiments are possible, including, for example, a surface having other profiles to mechanically align the detachable optical interface with a substrate. As another example, the first surface may comprise one of several steps defining the top cavity. Still other embodiments will be obvious to those skilled in the art in light of this disclosure and to optimize, for example, manufacturability and optical performance.

The depth of the top cavity is one of the factors in establishing a relatively short distance between the optical surface (e.g., lenses/reflective surface) of the optical interface and the optical devices mounted to the bottom surface of the substrate, while still facilitating a relatively thick substrate. It has been found that a thicker substrate not only is easier to handle but also facilitates better alignment. That is, deeper alignment fiducials/holes provide for increased stability and alignment. Generally speaking, a substrate thickness of at least about 300 µm is preferred, although not necessary. In one embodiment, the substrate has a thickness of at least about 400 µm, in another embodiment, the substrate has a thickness at least about 500 µm, and in yet another embodiment, the substrate has a thickness of at least about 700 µm.

On the other hand, the distance of the optical path between the optical surface (e.g., lenses or reflective surfaces) of the optical interface and the optical devices should be relatively short to manage issues relating to the divergence of the beam from the optical devices. In one embodiment, the optical surface of the interface will be disposed near the first surface 102a when the interface is disposed in the substrate. Likewise, the light emitting/receiving surface of the optical devices will be at or near the bottom surface 102b of the substrate when the devices are mounted thereon. The distance between the first surface and the bottom surface is referred to herein as the optical path distance. Accordingly, it is generally preferred to keep the optical path distance relatively short. Generally speaking, an optical path distance of no greater than about 400 µm is preferred, although not necessary. In one embodiment, the optical path distance is no greater than about 300 µm, and in another embodiment, such distance is no greater than about 250 µm.

Based on the desired thickness of the substrate and the desired optical path distance, the depth of the top cavity 102 can be determined. For example, if a thickness of 600 µm and an optical path distance of 250 µm are desired, then the depth of the top cavity 102 will be about 350 µm.

The bottom cavities function to provide an opening for the divergent beam from the optical devices, but the width of bottom cavities is minimized in size to maximize the perimeter around the bottom cavities to facilitate the attachment of optical devices. (It should be understood that regardless of the shape of the cavities, the term "width" is the maximum distance across an opening. The bottom cavities can be configured in different ways. For example, each of the cavities may be round or circular in shape or they may be rectilinear. Alternatively, rather an having side wall(s) that are essentially normal to the top and bottom surface, the cavities may have a tapered or conical wall(s), such that the width increases from bottom to top. Again, one skilled in the art will understand which configuration optimizes manufacturability and optical performance.

It should be understood that the number of bottom cavities in a series may vary. Generally speaking, it is preferred, although not necessary, to group a series of bottom cavities to correspond to an array of light-emitting surfaces in a single optical device. For example, the embodiment of the substrate shown in FIG. 1c is configured with four bottom cavities 104 in a series to accommodate a four-channel optical device. It should be understood, however, that the present invention is not limited to four cavities in a series and may be configured to accommodate any optical device, which will be obvious to those skilled in the art in light of this disclosure The bottom cavities are wide enough to accommodate the divergent beam such that the divergent beam does not impinge the side wall(s) 104a of the bottom cavity. It should be understood that the width of the bottom cavity will be a function of the depth of the bottom cavity. The greater the depth of the bottom cavity, the wider the bottom cavity needs to be to accommodate the divergent beam 120.

On the other hand, the width is restricted by the minimum perimeter area on the bottom surface around the bottom cavities needed to accommodate the optical devices. Specifically, the optical devices are typically, although not necessarily, grouped in arrays, having a particular pitch between optical axes of the optical device. The pitch can vary, although, at this time, a pitch of 250 µm is common. The perimeters around the bottom cavities need to be sufficiently large to accommodate interfacing the optical devices electrically and mechanically with the substrate. The electrical and mechanical interfaces between the substrates and the optical devices are well known and accordingly are not addressed in detail herein. Suffice it to say, that often (but not always) the interface may require 360° access around the optical device. Thus, a 360° perimeter around the bottom cavity of sufficient area may be required for each optical device. It should be understood that if a perimeter around each optical axis is not required, two or more bottom cavities may be joined to form an elongated continuous cavity.

The depth of the bottom cavity will be a function of the pitch of the optical axis of the optical device and the divergence of the beams. Another consideration with respect to the depth of the bottom cavities is the minimal thickness of the material between each bottom cavity. If the depth is too small, then the web of material between the bottom cavities may not be strong enough to support adequately the optical devices on the perimeter. Again, one skilled in the art can readily determine the minimum thickness of the web. Generally, a thickness of at least about 100 µm or so is desired, although not necessary. One skilled in the art can readily determine the optimum size/width and depth of the bottom cavities in light of this disclosure. For example, if the divergence of the beam is about 30° and the pitch is about 250 µm, a depth of 100 micron is suitable.

The expansion cavities 103 function to accommodate the divergent beam of the optical components. Specifically, referring to FIG. 1c and the magnified portion thereof, the expansion cavity functions to expand the volume above the bottom cavities to accommodate the divergent beam 120 of the optical device 107. More specifically, in this embodiment, as shown in the magnified view, the divergent beam 120 eventually expands to a point where its diameter exceeds the width of the bottom cavity 104. To accommodate the beam's increasing diameter, the expansion cavity 103 provides an expanded volume above the bottom cavity 104 allowing the beam to expand without interference from the side walls 104a of the bottom cavities 104. Likewise, in the embodiment of FIG. 4b, as shown in the magnified view, the divergent beam 120 eventually expands to a point where its diameter exceeds the width of the bottom cavity 404. To accommodate the beam's increasing diameter, the expansion cavity 403 provides an expanded volume above the bottom cavity 404 allowing the beam to expand without interference from the side walls 404a of the bottom cavities 104. In this particular embodiment, the light 120 couples with the detachable optical interface directly from the expansion cavity 403, and does not enter a third cavity (top cavity 102 as disclosed in the embodiment of FIG. 1c).

The configuration of the expansion cavity can vary according to preferences and applications. In the embodiment shown in FIGS. 1a-c, a single expansion cavity 103 connects each series of bottom cavities 104 in one elongated cavity. As shown, the expansion cavity 103 is defined in part by a second surface 103a below the first surface 102a. In this embodiment, the first and second surfaces are generally planar and generally parallel. In one embodiment, a single cavity, which is the expansion cavity 103, can be used to expand the volume above one or more series of bottom cavities 104. In still another embodiment, more than one expansion cavity 103 can be used to expand the volume of a single series of bottom cavities 104. In yet another embodiment, more than one expansion cavity 103 may be used in series to join the bottom and top cavities 104, 102. In other words, the expansion cavities 103 may be a series of contiguous cavities, increasing in width from bottom to top, thus resembling an upside down tiered structure. Likewise, as with the bottom cavity, the expansion cavity may have a tapered or conical wall(s), such that the width increases from bottom to top, like an upside down cone or pyramid. It should also be understood that the interface between the bottom cavity and the expansion cavity may be continuous, as the bottom cavity transitions into the expansion cavity seamlessly. Still other embodiments will be obvious to those skilled in the art in light of this disclosure.

With respect to the expansion cavity 103, its depth is generally a function of the depth of the top and bottom cavities 102, 104. Specifically, expansion cavity 103 functions to expand and join the volume of the bottom cavity 104 with the top cavity 102, and thus the depth of the expansion cavity (or cumulative depth of a series of the expansion cavities as described above), will be the distance between the first surface and top of the bottom cavity. For example, in the example above, if the substrate has a thickness of about 600 µm, a top cavity depth of about 350 µm, and a bottom cavity depth of about 100 micron, then the expansion cavity depth will be about 150 micron.

It should be understood that the depth of the top, bottom and expansion cavities can be adjusted to optimize manufacturability and optical performance in light of this disclosure.

The alignment fiducial 106 on top surface 101a of the substrate facilies passive alignment with the detachable optical interface. The present invention may employ a variety of different alignment fiducials. For example, in one embodiment, the fiducial is one or more alignment holes to receive protrusions of the detachable optical interface to facilitate alignment with the detachable optical interface. Applicants have found that the deeper the alignment holes, the more accurate the alignment. Alternatively, the alignment fiducial 106 and the detachable optical interface may comprise cooperating alignment holes, both of which are adapted to receive an alignment pin for aligning the substrate to the detachable optical interface. In yet another embodiment, rather than the alignment fiducial 106 being a hole defined in the substrate, it may be protrusion which is received by the detachable optical element. Still other alignment approaches to facilitate passive alignment will be known to those of skill in the art in light of this disclosure. In one embodiment, the alignment fiducial is positioned on the top surface at a point of maximum thickness of the substrate.

The bottom surface 101b, 401b of the substrate functions to mount and interface the optical devices. In particular, as mentioned above, the perimeter 105, 405 functions to provide a surface on which the optical device can be mounted. The dimensions/configuration of the perimeter required to facilitate mechanical and electrical interfacing with the optical device will be understood by one of skill in the art in light of this disclosure. Obviously, the configuration of the perimeter, including, for example, the electrical traces, and fiducials to facilitate alignment of the optical device on the perimeter can vary. For example, in one embodiment, the perimeter comprises a number of electrical traces for interfacing with the electrical contacts of the optical device. In another embodiment, the perimeter has fiducials to cooperate with the corresponding fiducials on the optical device to facilitate alignment on the perimeter. For example, the fiducials may be protrusions for physical/passive alignment or fiducials to help facilitate active alignment or visual fiducials for passive alignment. In other embodiments, the electrical contacts may also function as fiducials and may also function to facilitate passive alignment. For example, solder balls or similar structures may be used to align the optical device on the perimeter through surface tension of the solder.

The optical device 107, 207 may be any known or later-developed component that can be optically coupled to an optical conduit as described below. The optical device may be for example: (a) an optoelectric device (OED), which is an electrical device that sources, detects and/or controls light (e.g. photonics processor, such as, a complementary metal oxide semiconductor (CMOS) photonic processor, for receiving optical signals, processing the signals and transmitting responsive signals, electro-optical memory, electro-optical random-access memory (EO-RAM) or electro-optical dynamic random-access memory (EO-DRAM), and electro-optical logic chips for managing optical memory (EO-logic chips), lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); (b) a passive component, which does not convert optical energy to another form and which does not change state (e.g., fiber, lens, add/drop filters, arrayed waveguide gratings (AWGs), graded-index (GRIN) lens, splitters/couplers, planar waveguides, or attenuators); (c) a hybrid device which does not convert optical energy to another form but which changes state in response to a control signal (e.g., switches, modulators, attenuators, and tunable filters); (d) a Photonic Integrated Circuit (PIC) comprising a combination of sub-components including, for example, one or more of laser optical source components, passive optical waveguides, optical modulators, optical wavelength division multiplexors, optical waveguide grating couplers, optical mode matching elements, optical wavelength de-multiplexors, optical polarization combiners/splitters/rotators, and optical detectors. The optical component may comprise an electrical interconnection interface, an optical interconnection interface, and a thermal interconnection interface. It should also be understood that the optical device may be a single discrete device or it may be assembled or integrated as an array of devices. In one embodiment, the optical device comprises an array of VCSELs which emit a diverging beam as known in the art. In another embodiment, the optical device comprises a photo diode to receive a non-diverging beam from the detachable optical interface described below.

It should be understood that with many optical devices, there may be additional drive circuitry or other circuitry for facilitating the function of the optical device. Such driver circuitry and its method of installation on the substrate are well known in the art.

In one embodiment, the optical devices are soldered to the bottom portions of the substrate and then sealed with an underfill 111, 411. The use of underfill is a known technique in assembling interposers. However, because of the bottom cavities 104, 404 present in the substrate 100, 404 of the present invention, in one embodiment, a buffer layer 110, 410 is disposed on the bottom surface of the substrate to prevent the optical underfill from seeping into the cavities and potentially interfering with the optical beam 123.

The detachable optical interface functions to connect to the substrate to optically couple the optical conduits 205 to the optical devices, and to disconnect from the substrate to facilitate, among other things, manufacturability by allowing reflow soldering of the substrate onto a circuit board. Reflow soldering cannot be done with the interface 200 attached—i.e., the optical interface 200, normally molded in polymer, cannot withstand reflow temperatures. To this end, a portion of the detachable optical interface 200 is configured to fit within the top cavity as described above. Specifically, as shown in FIG. 2b, in this configuration, the detachable optical interface 200 comprises a protrusion 220 which is configured to fit within the top cavity 102. In this particular embodiment, a planar surface 207 is configured to interface with the planar first surface 102a of the substrate, thereby positioning interface 200 vertically. Additionally, the optical interface 200 comprises one or more structures to hold and align the optical conduits, as described below. The optical interface 200, in one embodiment, has also alignment fiducials for cooperating with the alignment fiducials of the substrate to align the optical conduit with the optical components.

Figure 2A:
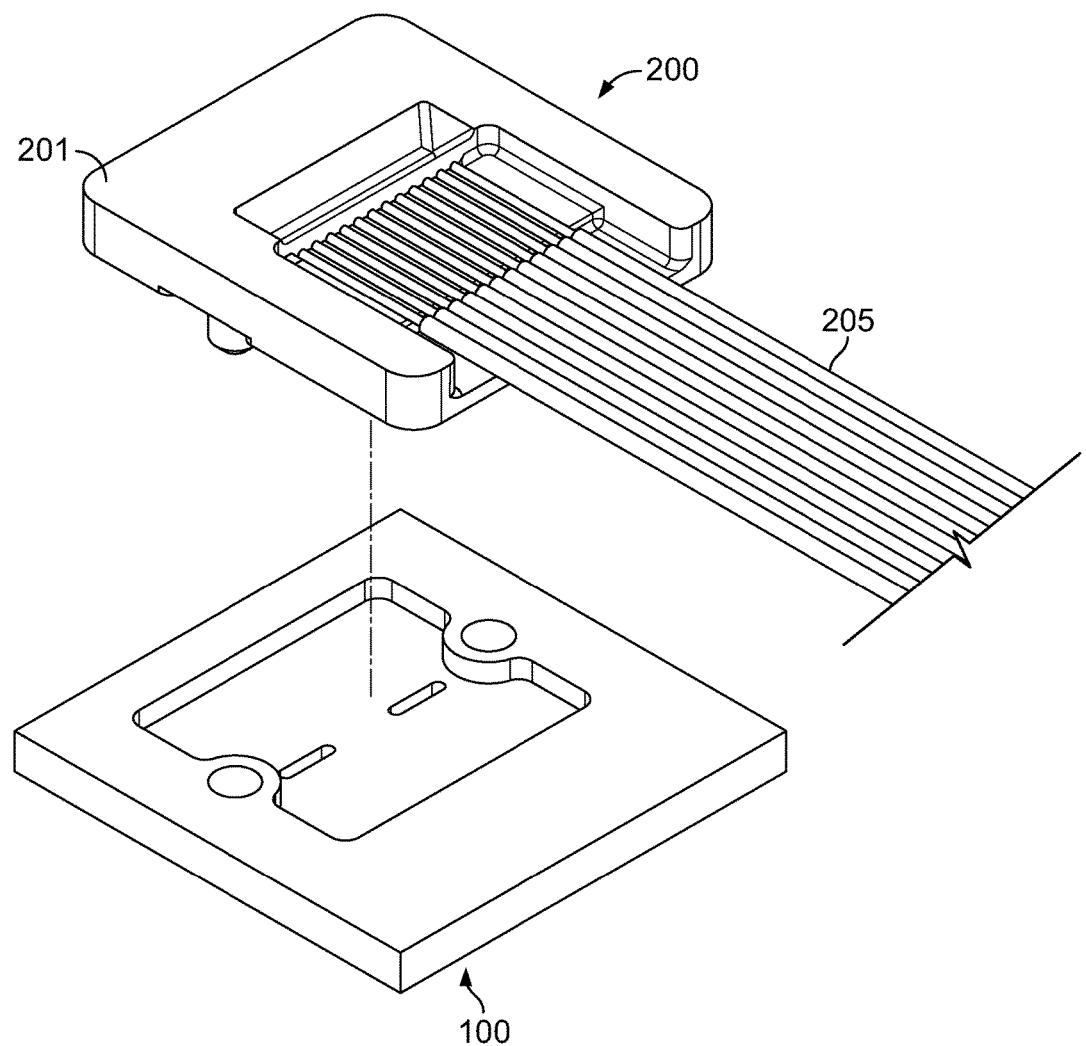

The optical conduit 205 may be any known medium for transmitting light. Suitable optical conduits include, for example, optical fibers, waveguides, and planar waveguides. In the embodiment of FIG. 2a, the optical conduit 205 is an optical fiber. The fiber may be any known optical fiber including, for example, single mode, a multimode, or a polarization-maintaining single mode fiber. Likewise, the fiber may be configured in any known way, including, for example, as a fiber stub, a discrete fiber, part of a fiber ribbon, a long fiber, or as part of a pigtail for splicing or connection to a longer length of fiber.

The optical conduit may be secured to the interposer and aligned with the second optical path in a variety of known ways. For example, in the embodiments of FIGS. 2a-b, the body of the detachable optical interface is molded with grooves 203 to hold the fibers in place with adhesive. The grooves may comprise convention V or U grooves. Alternatively, rather than molding the detachable optical interface with grooves, compliant guides may be used as disclosed in U.S. patent application Ser. No. 13/871,571.

In an embodiment in which the optical conduits are essentially parallel to the substrate, some kind of optics are required to bend the light orthogonally. In one embodiment, a 90° light turning reflective surface 204 is used as shown in FIG. 2b. The reflective surface 204 serves to bend the light between the optical conduit and optical device. Suitable reflective surfaces are well known and include, for example, reflective and refractive light-bending surfaces. The reflective surface may be a discrete component that is attached to or disposed on the surface of the detachable optical interface or it may be integrally formed therein. Still other embodiments will be known or obvious to one of skill in the art in light of this disclosure.

In one embodiment, the potential optical interface 200 comprises a series of lenses 202 to optically focus divergent beams being emitted from optical device transmitters, and to focus beams to optical receiving devices. Such lenses are known in the art.

In one embodiment, the detachable optical device also comprises alignment fiducials 206 to cooperate with the alignment fiducial 106 of the substrate. The various types of alignment fiducials are described above with respect to the alignment fiducial 106. As shown in the embodiment of FIG. 2b, the fiducial 206 is a protrusion adapted to be received in the alignment hold fiducial 106 of the substrate.

The detachable interface may be connected to the substrate in a various ways. For example, in one embodiment, a resilient clip is used to provide a downward urging force on the detachable optical interface. Alternatively, for permanent attachment of the optical interface to the substrate, adhesive may be used. Still other embodiments will be known or obvious to those of skill in the art in light of this disclosure.

Figure 3B:
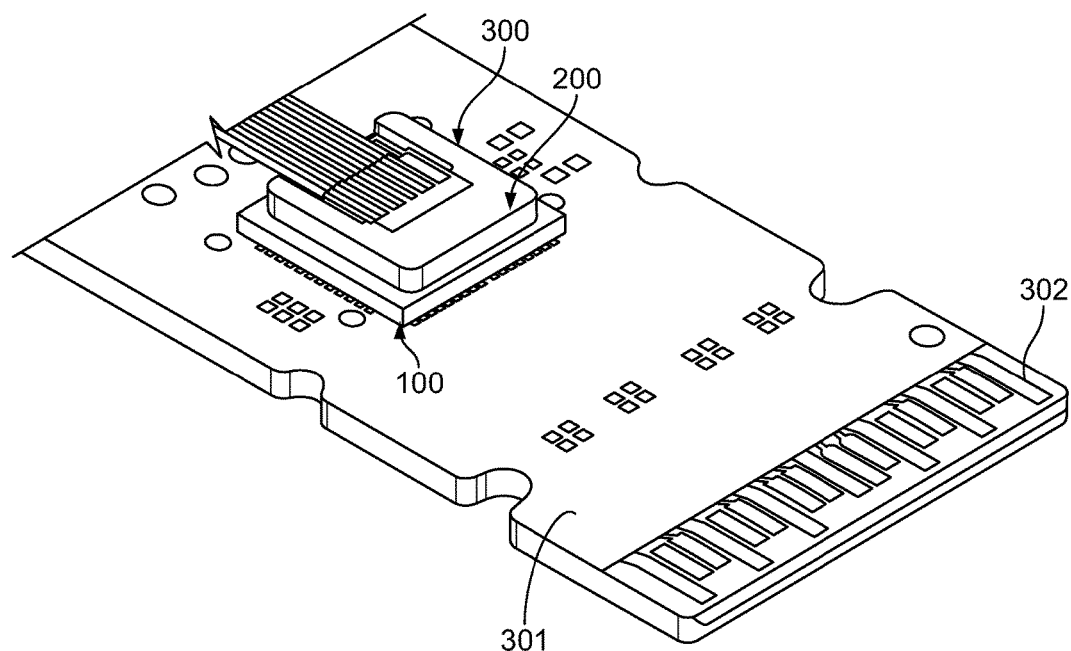
FIG. 3b shows an expanded and perspective view of the interposer of FIG. 3a, connected to the PCB.

Referring to FIGS. 3a-b, the interposer 300, which comprises the substrate 100 and the detachable optical interface 200, is shown installed on a printed circuit board (PCB) 301. Such a configuration is generally known in the art, and comprises a PCB having an edge to be coupled with a card edge connector 302 (not shown). Other packaging approaches will be known to those skilled in the art in light of this disclosure.

The interposer of the present invention also lends itself to economical and highly repeatable manufacturing. In one embodiment, a significant portion of the preparation of the assembly is performed at the wafer/panel stage. That is, rather than preparing each assembly as a discrete component, multiple assemblies can be prepared simultaneously on a wafer/panel. This is a known technique to facilitate large-scale manufacturability. Benefits of wafer/panel fabrication include the ability to define multiple features and components on multiple optical assemblies in one step. For example, most if not all of the critical alignment relationships may be defined on the wafer/panel scale, often in just a few, or even a single, photolithography step. Specifically, the location of the fiducials, grooves, and the contact pads/pillars for electrically connecting and providing passive alignment of the optical components may be defined in a single masking step. Additionally, in one embodiment, the optical/electrical interconnections among the various components may be defined in a single masking step. For example, the various traces interconnecting the pads/pillars for the optical component and the pads for the electrical driver circuitry, and the traces between the driver circuitry and the through substrate vias may be defined in a single masking step. In one embodiment, even the edges of the optical component and substrate are defined in the same masking step. For example, each edge of the optical component is one half of a groove etched in the wafer/panel. The wafer/panel is simply parted at the bottom of each groove to form optical components with precisely controlled edges. This way, the distance from the edge of the optical component to critical features may be precisely controlled, often in a single step, thereby eliminating tolerance build up and simplifying assembly manufacturing with the optical component by use of these precisely controlled edges. These advantages are expected to increase as the size of wafer/panels and their handling capabilities increase as well. Further economies may be realized by etching these features using the same photolithographic procedure. Although a single etching procedure may be used, in certain circumstances, two or more etching procedures may be beneficial. Other embodiments will be known or obvious to those of skill in the art in light of this disclosure.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not necessarily be limited to the particular embodiments disclosed herein.

What is claimed is:

1. An interposer comprising:
   a substrate having at least:
   a top surface and a bottom surface, said top and bottom surfaces being substantially parallel;
   at least one series of bottom cavities on said bottom surface;
   at least one expansion cavity contiguous with said at least one series of bottom cavities, said at least one expansion cavity being larger than each of said bottom cavities;
   a perimeter defined on said bottom surface around said bottom cavities;
   at least one alignment fiducial on said top surface for cooperating with a corresponding fiducial on said detachable optical interface to optically couple an optical conduit attached to said detachable optical interface with at least one optical device; and
   said at least one optical device mounted to said substrate on at least a portion of said perimeter, said optical device configured to emit a diverging light beam or receive a non-diverging light beam.

2. The interposer of claim 1, wherein said substrate further comprises a top cavity for receiving a detachable optical interface, wherein said expansion cavity is smaller than said top cavity.

3. The interposer of claim 2, wherein the distance between said top and bottom surfaces is at least 300 μm.

4. The interposer of claim 3, wherein the distance between said top and bottom surfaces is at least 500 μm.

5. The interposer of claim 2, wherein said top cavity is defined in part by a first surface, said first surface is planar and substantially parallel to said top surface.

6. The interposer of claim 5, wherein the distance between bottom surface and said first surface in no greater than 300 μm.

7. The interposer of claim 6, wherein the distance between said bottom surface and said first surface is between 250 and 300 μm.

8. The interposer of claim 5, wherein said expansion cavity is defined in part by a second surface, said second surface is planar and substantially parallel to said first surface.

9. The interposer of claim 8, wherein said bottom cavity is sized to be larger than the diameter of said diverging light beam at said second surface.

10. The interposer of claim 1, wherein said series of said bottom cavities is a straight array of said bottom cavities.

11. The interposer of claim 10, wherein the bottom cavities in said series of bottom cavities have a pitch of about 250 μm.

12. The interposer of claim 1, wherein said at least one fiducial comprises two alignment holes.

13. The interposer of claim 12, wherein said two alignment holes are defined in the thickest portion of said substrate.

14. The interposer of claim 1, further comprising a buffer layer on said bottom surface.

15. The interposer of claim 14, further comprising an underfill over said optical device.

16. The interposer of claim 1, further comprising said detachable optical interface.

17. The interposer of claim 16, wherein said detachable optical interface comprises at least one lens, each lens aligned with said perimeter around each bottom cavity.

18. The interposer of claim 1, wherein said substrate comprises a crystalline material.

19. The interposer of claim 18, wherein said crystalline material is silicon.

20. A substrate comprising silicon and having at least:
   a top surface and a bottom surface, said top and bottom surfaces being substantially parallel;
   at least one series of bottom cavities on said bottom surface;

at least one expansion cavity contiguous with said at least one series of bottom cavities, said at least one expansion cavity being larger than each of said bottom cavities;

a perimeter defined on said bottom surface around said bottom cavities for interfacing with an optical device; and at least one alignment fiducial on said top surface for cooperating with a corresponding fiducial on a detachable optical interface to optically couple an optical conduit attached to said detachable optical interface with said optical device.

21. The substrate of claim 20, further comprises a top cavity for receiving said detachable optical interface, wherein said expansion cavity is smaller than said top cavity.

* * * * *